US010160086B2

United States Patent
Kempf

(10) Patent No.: US 10,160,086 B2
(45) Date of Patent: Dec. 25, 2018

(54) BLADE POSITIONING

(71) Applicant: ROLLS-ROYCE plc, London (GB)

(72) Inventor: Daniel Kempf, Derby (GB)

(73) Assignee: ROLLS-ROYCE plc, London (GB)

(*) Notice: Subject to any disclaimer, the term of this patent is extended or adjusted under 35 U.S.C. 154(b) by 183 days.

(21) Appl. No.: 15/284,168

(22) Filed: Oct. 3, 2016

(65) Prior Publication Data

US 2017/0266777 A1    Sep. 21, 2017

(30) Foreign Application Priority Data

Oct. 20, 2015  (GB) .................................. 1518570.5

(51) Int. Cl.
| | |
|---|---|
| B24B 19/14 | (2006.01) |
| B23P 15/02 | (2006.01) |
| F01D 5/02 | (2006.01) |
| F01D 5/12 | (2006.01) |
| F04D 29/32 | (2006.01) |
| F01D 5/30 | (2006.01) |

(Continued)

(52) U.S. Cl.
CPC .............. *B24B 19/14* (2013.01); *B23P 15/02* (2013.01); *F01D 5/02* (2013.01); *F01D 5/12* (2013.01); *F04D 29/324* (2013.01); *F01D 5/3007* (2013.01); *F01D 11/12* (2013.01); *F01D 25/285* (2013.01); *F05D 2220/32* (2013.01); *F05D 2230/10* (2013.01); *F05D 2230/14* (2013.01); *F05D 2240/307* (2013.01)

(58) Field of Classification Search
CPC .......... B23P 15/02; B23P 15/04; B23B 19/14; F01D 5/005; F01D 5/02; F05D 2220/32; F05D 2230/10; F05D 2240/307; F04D 29/526

See application file for complete search history.

(56) References Cited

U.S. PATENT DOCUMENTS

| | | | | |
|---|---|---|---|---|
| 2,730,794 A | * | 1/1956 | Schorner | B23Q 3/08 |
| | | | | 29/889.2 |
| 9,624,778 B2 | * | 4/2017 | Raven | B23P 6/002 |
| 9,752,593 B2 | * | 9/2017 | Bagnall | F04D 29/526 |

(Continued)

FOREIGN PATENT DOCUMENTS

| | | |
|---|---|---|
| EP | 1 219 786 A2 | 7/2002 |
| JP | S59-110804 A | 6/1984 |
| JP | 2012-202352 A | 10/2012 |

OTHER PUBLICATIONS

Mar. 21, 2016 Search Report issued in British Patent Application No. 1518570.5.

*Primary Examiner* — Timothy V Eley

(74) *Attorney, Agent, or Firm* — Oliff PLC

(57) ABSTRACT

A method of, and apparatus for, urging blades of a gas turbine engine radially outwardly is disclosed. The method may be used to grind blade tips of blades of a rotor stage of a gas turbine engine. The method comprises locating a fluid-tight bag which is in a radial gap formed between a radially inner surface of a respective blade root and a slot in a disc which the blade root cooperates. The method comprises inflating the fluid-tight bag and rotating the rotor stage relative to a grinding surface so as to grind any blade tips that contact the grinding surface during rotation. This results in more accurate positioning of the blades during the grinding process and/or during operation.

15 Claims, 4 Drawing Sheets

(51) Int. Cl.
   *F01D 11/12*     (2006.01)
   *F01D 25/28*     (2006.01)

(56) References Cited

U.S. PATENT DOCUMENTS

2015/0369051 A1* 12/2015 Raven .................... F01D 5/3038
                                                    29/889.21
2016/0177971 A1*  6/2016 Bagnall ................. F01D 11/122
                                                    415/173.4

* cited by examiner

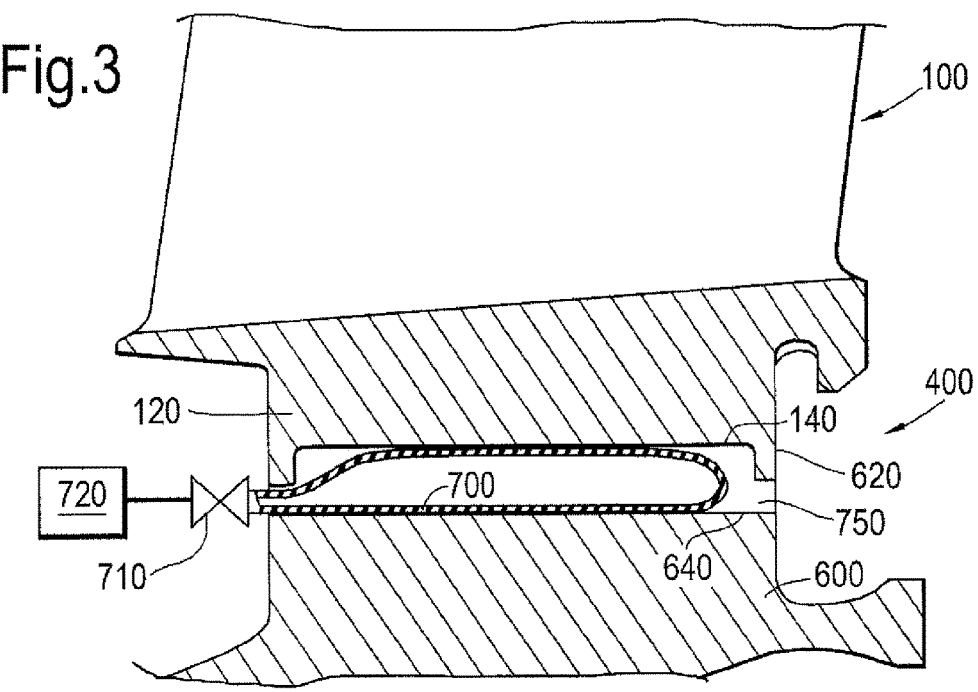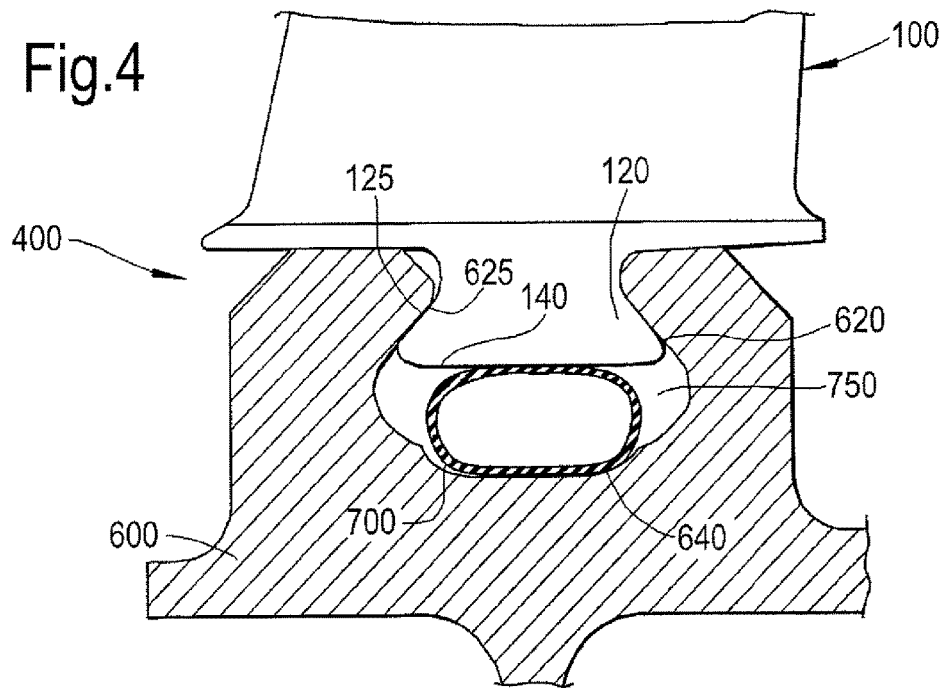

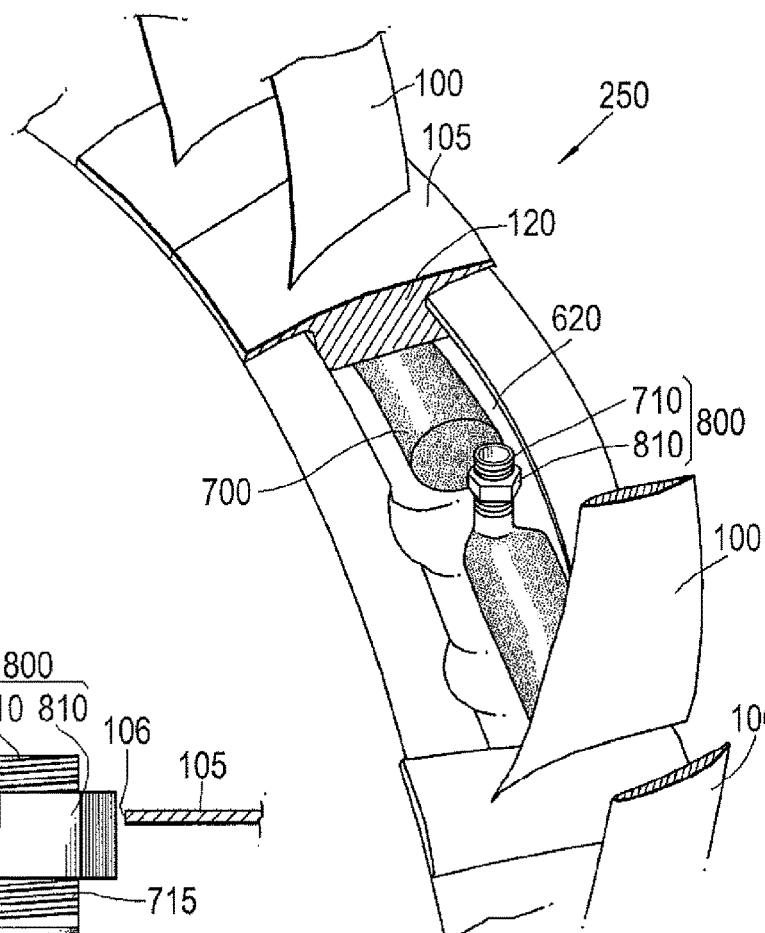
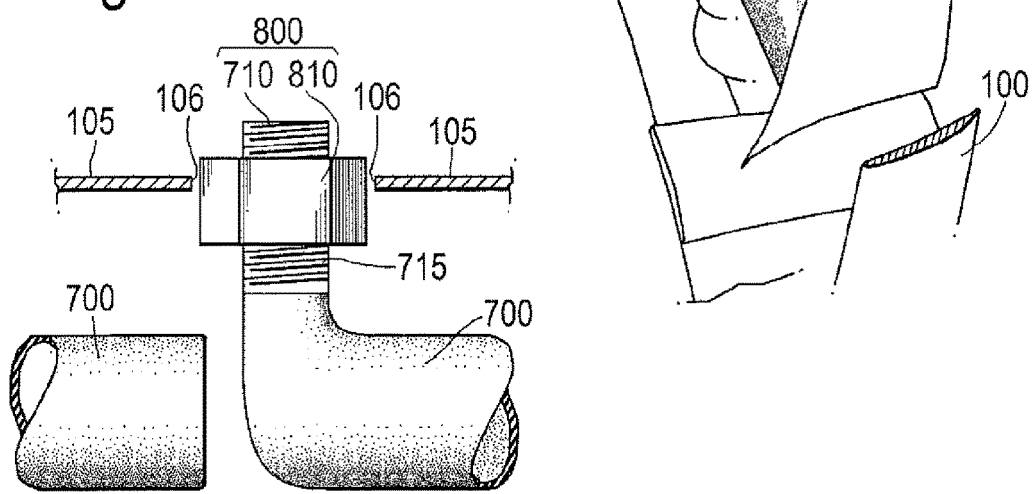
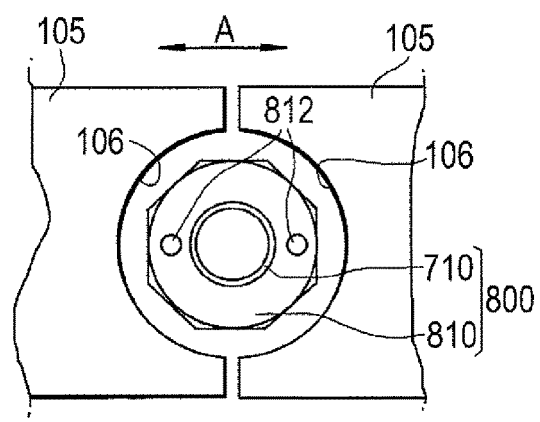

BLADE POSITIONING

CROSS-REFERENCE TO RELATED APPLICATIONS

This application is based upon and claims the benefit of priority from British Patent Application No. 1518570.5 filed 20 Oct. 2015, the entire contents of which are incorporated by reference.

BACKGROUND

1. Field of the Disclosure

The present disclosure relates to a method and apparatus for positioning blades of a gas turbine engine, for example during manufacturing the blades of a rotor for a gas turbine engine. In particular, but not exclusively, this invention can relate to a method of grinding the tips of the blades.

2. Description of the Related Art

A gas turbine engine typically comprises multiple rotor stages and multiple stator stages. The rotor stages comprise blades that rotate within a casing. The efficiency at which the engine operates can be affected by flow leaking between the rotor blades and the casing during use, which may be referred to as over-tip leakage. This may apply both to compressor rotor stages and to turbine rotor stages, but may be particularly important in compressor stages.

In order to minimize such leakage, an abradable liner may be used to circumferentially surround the blades. This abradable liner may be abraded by the tips of the blades in use in order to try to provide a good seal during engine running.

However, in order for the abradable liner to be effective, all of the tips of all of the compressor blades must be at the same radial position, or at least as close to being at the same radial position as possible. Any difference in radial tip position means that the abradable liner is abraded away by the blade tip at the further radial position, which in turn results in a radial gap between the other blade tips and the abradable liner. This radial gap may allow increased over-tip leakage, and thus decreased engine efficiency.

It is therefore important to ensure that the radial positions of the tips of all of the rotor blades in a rotor stage of a gas turbine engine are as close to being the same as possible. To this end, a grinding process may be used on the blade tips during manufacture. Such a grinding process may involve rotating a rotor stage relative to a grinding surface. The grinding surface may thus be used to try to grind the tips of the blades to the same position.

However, a problem occurs during this grinding process which may be said to be because of the way in which the blades are secured into the rotor disc. In particular, the blades are conventionally secured into one or more slots in the rotor disc. For example, each blade may have a root that is secured into a respective slot in the rotor disc that extends in a generally axial direction. Alternatively, each blade may have a root, and the roots of all of the blades may be secured into a single circumferentially extending slot in a rotor disc.

Regardless of whether the roots of the blades are secured in an axially extending slot or a circumferentially extending slot, there is necessarily a degree of play or movement allowed between the blade root and disc slot in order for the blades to be slotted into place during assembly. However, this play or movement means that the blade can adopt a range of different positions when the rotor stage is rotated depending on, for example, exactly where the blade root and disc slot engage as the rotor speed is increased and the blade is centrifuged radially outwardly. Accordingly, during the tip grinding process, the engagement of one blade root in a slot may be at a different position to another blade root in its slot. This may result in the shape and/or absolute radial extent of the blades being different after the grinding process because, although all of their tips may engage the same grinding surface, their root may be in different positions and/or the blades may be at slightly different angles (i.e. they may not all be exactly radial and/or may have different axial lean components, again depending on the engagement position of the blade root with the slot). When the resulting different shaped and/or sized blades are rotated during running of a gas turbine engine, the differences in their geometry may lead to increased unwanted abrasion of the abradable liner. In turn, this may result in increased over-tip leakage, and thus decreased stage and engine efficiency.

OBJECTS AND SUMMARY

Accordingly, it is desirable to ensure that the tip grinding process results in blade tips with reduced over-tip leakage and/or improved engine efficiency. It is also desirable more generally to ensure that the tips of the blades are in a known position during use as well as during grinding.

According to an aspect, there is provided a method of grinding blade tips of blades of a rotor stage of a gas turbine engine. The rotor stage comprises a rotor disc and a plurality of radially extending blades, each blade comprising a root that cooperates with a slot in the rotor disc to secure the blade to the rotor, with a radial gap being formed between a radially inner surface of a respective root and the slot. The method comprises: locating a fluid-tight bag such that it is positioned in the radial gap; inflating the fluid-tight bag; and rotating the rotor stage relative to a grinding surface so as to grind any blade tips that contact the grinding surface during rotation. The rotation of the rotor stage relative to the grinding surface may be about an axial direction.

The tips of the blades (and/or the blades themselves) may be pushed/urged radially outwardly by inflation of the fluid-tight bag (which may be referred to as a fluid-impermeable bag). The tip of each blade may be pushed/urged to its maximum radially outward extent by inflation of the fluid-tight bag. The inflated fluid-tight bag may ensure that the blade extends (for example the longitudinal or spanwise direction of the blade extends) in a radial direction, or at least that the blade extends in a known direction, such as a design direction. The blade may be said to be fully extended by the inflated bag.

An apparatus for use in grinding the tips of rotor blades that extend radially from a root that cooperates with a slot in a rotor disc to secure the blade to the rotor of a gas turbine engine to a tip is provided. The apparatus comprises a fluid-tight bag for locating in a radial gap between a radially inner surface of a respective root and the slot. The apparatus comprises a fluid supply source for connecting to the fluid-tight bag in order to provide positive pressure to the fluid-tight bag in order to urge the rotor blades in a radially outward direction.

Each and every blade may have a fluid-tight bag located in its respective radial gap. Each and every blade may be urged radially outwardly by inflation of a respective fluid-tight bag.

The methods and apparatus of the present disclosure may help to ensure that each blade root is in the same position within its slot (and/or relative to its slot) as the other blade roots are within (and/or relative to) their blade slots. This may be beneficial during a grinding operation of the blade tips and/or during normal engine operation. For example, the methods and apparatus may help to ensure that the grinding operation produces blades having uniformly positioned blade tips. The methods and apparatus of the present disclosure may be said to result in more accurate positioning of the blades during the grinding process and/or during use, for example during engine running.

The root of each rotor blade may extend substantially in an axial direction (for example in a substantially axial direction when assembled to the rotor disc). The slot with which each root cooperates may be a respective axially extending slot in the rotor disc. The radial gap formed by each root may be a respective axially-extending radial gap. The method may comprise locating and inflating a separate fluid-tight bag into each individual axially-extending radial gap before rotating the rotor stage to grind the tips. Where a gap, root, or slot is said to be axially-extending (or substantially axially-extending), it will be appreciated that this includes directions that are not precisely axial but have a substantial axial component, for example a greater axial component than radial component.

The method may comprise connecting more than one fluid-tight bag (for example all fluid-tight bags) to a single fluid supply. Such a single fluid supply may be used to inflate all of the fluid-tight bags to which it is connected. This may be referred to as synchronous filling of multiple bags.

Alternatively, each fluid-tight bag may be connected to a separate respective fluid supply.

The root of each rotor blade may extend substantially in a circumferential direction (for example in a substantially circumferential direction when assembled to the rotor disc). The slot with which each root cooperates may be a single slot that extends circumferentially (including substantially circumferentially) around the rotor disc. Each root may cooperate with the same circumferentially-extending slot. The radial gap may be part of a continuous circumferentially-extending radial gap that extends around the entire circumference of the rotor disc. Such a continuous circumferentially-extending radial gap may be formed by a plurality of individual radial gaps, each formed by the roots of a rotor blade and each extending around a segment of the circumference. The method may comprise locating and inflating a single circumferentially extending fluid-tight bag in the continuous circumferentially-extending radial gap before rotating the rotor stage.

Such a circumferentially extending fluid-tight bag may be circumferentially split so as to have a first end and a second end. The first end and the second end may be slideable relative to each other, for example slidable in a circumferential direction. Sliding the first end relative to the second end may allow the circumference of the bag to be adjusted.

In an arrangement having a circumferentially split fluid-tight bag having a first end and a second end, the method of urging blades and/or grinding blade tips may comprise sliding the first end over the second end and adjusting the position of the first end relative to the second end so as to match the circumference of the fluid-tight bag to the circumference of the circumferentially extending slot and/or circumferentially extending radial gap. This may allow the same fluid-tight bag to be used during the grinding of the blades of a range of rotor stages that may be of different sizes and/or may have different circumferences (for example different rotor disc circumferences).

A circumferentially extending fluid-tight bag may comprise a circumferential locking feature. The circumferential locking feature may prevent circumferential rotation of the blades relative to the slot. The circumferential locking feature may extend radially between two blade platforms.

The two platforms between which the circumferential locking feature extends may be provided with cutouts to allow the circumferential locking feature to pass therethrough.

The circumferential locking feature may comprise a one-way valve having a threaded outer portion. A bolt may be provided to the threaded portion. Such a bolt may be adapted to receive a tightening tool, for example one or more recesses or notches on its radially outer surface. This may be useful for arrangements in which it is not possible to access the flats of the bolt with a tightening tool (such as a spanner) due to the proximity of the neighbouring blade platforms.

The or each fluid-tight bag may be provided into the position in which it is inflated at any suitable stage of the method. For example, the or each fluid-tight bag may be located into position before blades are assembled to the rotor disc to form the or each radial slot. Alternatively, if space permits, the or each fluid-tight bag may be provided into position after at least one (for example one, more than one or all) of the rotor blades have been assembled to the disc.

According to any arrangement, the or each fluid-tight bag may comprise a one-way valve. Such a one-way valve may allow fluid to pass into the fluid-tight bag, but not back out of the fluid-tight bag. The method may comprise connecting the or each fluid-tight bag to a fluid supply via its one-way valve prior to the inflation step.

The method may comprise disconnecting the or each fluid-tight bag from its fluid supply after the inflation step. Where the or each fluid-tight bag is used during a tip grinding process, the method may comprise disconnecting the or each fluid-tight bag from its fluid supply prior to the rotation step.

Any suitable fluid (gas or liquid) may be used to inflate the or each fluid-tight bag. For example, a gas such as air (for example compressed air) may be used. The fluid supply may comprise an air supply, which may provide compressed air (that is, air that has a high pressure than atmospheric and/or air that has been compressed using a compressor). Purely by way of non-limitative example, the fluid may have a pressure in the range of from 1 and 10 bar, for example 2 and 5 bar, for example 3 and 4 bar.

Where the or each fluid-tight bag is used during a tip grinding process the method may comprise removing the or each bag after the step of rotating the rotor stage to grind the blade tips. The or each bag may be deflated before removal. Thus, the rotor stage may not comprise the fluid-tight bag after final assembly and/or during normal engine running, such as in-service engine running. Alternatively, as described elsewhere herein, and inflated fluid-tight bag such as those described and/or claimed herein may be in position during normal engine running, such as in-service engine running.

Any suitable material may be used for the fluid-tight bag. Purely by way of non-limitative example, the fluid-tight bag may be an elastic material and/or may be expandable under pressure. The fluid-tight bag may be re-usable (for example, each bag may be used in at least one, for example more than one, tip-grinding operation).

For tip grinding operations, the grinding surface relative to which the rotor stage is rotated in the grinding step may be any suitable surface, for example a cylindrical or frustoconical surface. For example the grinding surface may be, or may be the same shape as, the radially inner surface of a casing of a gas turbine engine, which may be the same type of casing (for example in terms of shape and/or geometry) as that within which the blades will rotate in use.

According to an aspect, there is provided a method of manufacturing a rotor stage of a gas turbine engine comprising:

providing a rotor disc with a plurality of radially extending blades, each blade extending from a root which is secured into a slot in the rotor disc to a tip at its radially outer extent; and grinding the tips of the blades using any of the methods and/or apparatus described and/or claimed herein.

The step of providing a rotor disc with a plurality of radially extending blades may comprise inserting a root of each rotor blade into a slot in the rotor disc to secure the blade to the rotor.

According to an aspect, there is provided a method of manufacturing a gas turbine engine comprising grinding the tips of blades of at least one rotor stage of the engine according to any method or apparatus described and/or claimed herein.

The skilled person will appreciate that except where mutually exclusive, a feature described in relation to any one of the above aspects may be applied to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 3 is a schematic of a root region of a blade having an axially extending retention arrangement;

FIG. 4 is a schematic of a root region of a blade having a circumferentially extending retention arrangement;

FIG. 7 is a schematic showing a circumferentially extending fluid bag in a rotor stage;

FIG. 8 is a schematic view in a radial-circumferential plane showing a circumferential locking mechanism; and FIG. 9 is a schematic view in a circumferential-axial plane showing the circumferential locking mechanism of FIG. 8.

DETAILED DESCRIPTION OF EMBODIMENTS

Figure 1:
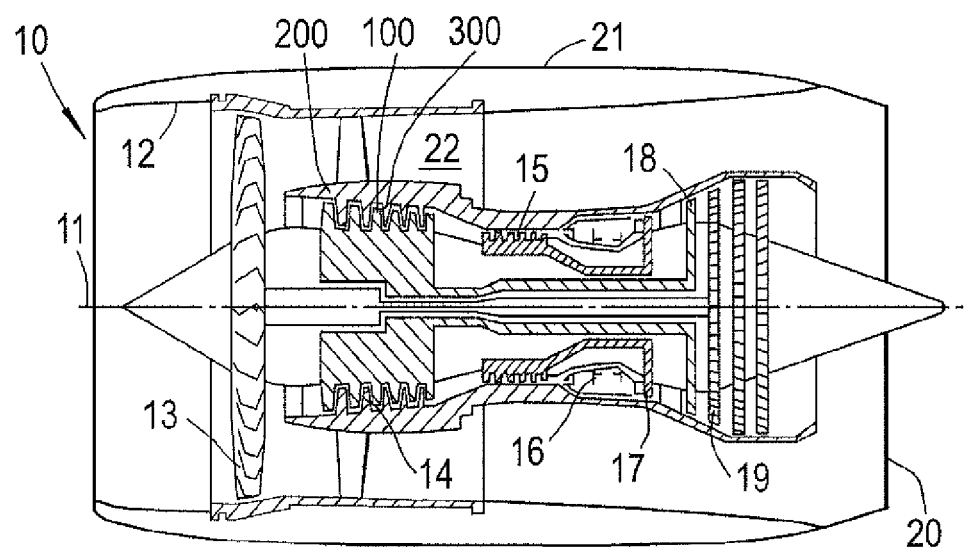
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The compressor and turbine rotor stages of the gas turbine engine 10 shown in FIG. 1, which is an example of a gas turbine engine 10 in accordance with the present disclosure, comprise blades 100, just one example of which is labelled in FIG. 1 for simplicity. As outlined elsewhere herein, it is important for the gap 300 between the blade 100 and the casing 200 within which it rotates to be as small as possible during use, whilst minimizing the possibility of the tips of a blade 100 rubbing against the casing 200.

Accordingly, the blades 100 of a rotor stage are subjected to a grinding operation before the engine 10 is put into service. The grinding operation attempts to ensure that all of the blades are as close as possible to being the same length as each other.

Figure 2:
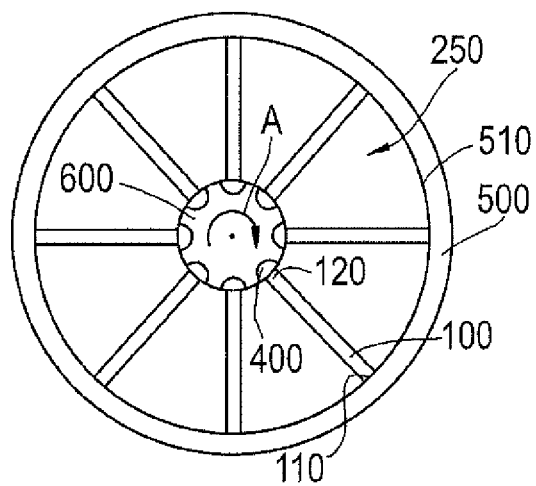
FIG. 2 is a schematic axial view of a rotor stage during a tip grinding operation.

With reference to FIG. 2, the blades 100 of a rotor stage 250 are shown schematically within a casing 500, which may be at least a part of, or may have the same geometry as at least a part of, the casing 200 within which the rotor stage 250 rotates during operation. The blades 100 extend from a root 120 to a tip 110.

The casing 500 has a grinding surface (or abrasive surface) 510 on its radially inner surface. In a grinding operation, the rotor blades 100 are rotated (for example using a motor) within the casing, such that the tips 110 of the blades are subjected to grinding where they contact the grinding surface 510. The rotation of the blades 100 is indicated by arrow A in FIG. 2, but of course could be either clockwise or anticlockwise about the rotational (or longitudinal) axis 11.

The blades 100 are held in position at their root 120 by a blade retention arrangement 400. The blade retention arrangement 400 may comprise, for example, an axially extending slot and root arrangement, or a circumferentially extending slot and root.

An axially extending blade retention arrangement 400 is shown in greater detail in FIG. 3. The blade root 120, which may be a dovetail root 120, extends in an axial direction (or at least has a significant component extending in the axial direction), which is the direction about which the stage 250 rotates, i.e. the same direction as the engine rotational axis 11 shown in FIG. 1. The axially extending blade root of FIG. 3 is retained within a corresponding axially extending slot 620 formed in the rotor disc 600. The rotor disc 600 may be the same as the rotor disc on which the blades 100 are mounted in the engine 10 in operation, or may be a specifically designed rotor disc for use in the grinding operation. In either case, the axially extending slot 620 may have the same geometry as the slot in which the root 120 is retained during operation of the engine 10.

As shown in FIG. 3, a gap 750, which may be referred to as a radial gap 750, is formed between the radially inner surface or portion 140 of the blade root 120 and the base 640 (which may be referred to as the radially inner surface) of the slot 620 in the disc 600. The radial gap 750 may be said to extend in an axial direction.

During tip grinding at least, a fluid-tight bag 700 is provided in the gap 750. The fluid-tight bag 700 is provided with a fluid (for example compressed air) from a fluid source 720 (which may be, for example, an air compressor). The fluid may be provided through a valve 710, as in the example shown in FIG. 3. Such a valve 710 may be a one-way valve that may allow the fluid to be retained in the fluid-tight bag 700 after the fluid supply 720 has been disconnected.

The fluid-tight bag 700 may thus be inflated by the fluid supply 720, thereby applying a force to the blade 100. The blade 100 may be urged, or pushed, generally radially outwardly by the force provided by the inflated fluid-tight bag 700. In turn, this may ensure that the blade 100 is pushed to its radially outermost position, for example for a the tip grinding operation and/or for engine operation. By ensuring that each blade 100 is extended to its radially outermost position using one or more fluid-tight bags 700, the position of each blade tip 110, for example relative to its root 120, can be more consistent between the blades 100 in the stage 250. The geometry of the blades 100 may be more consistent for each blade 100 in the stage 250 through use of the fluid-tight bag 700 to urge the blades 100 radially outwards during the grinding operation.

For rotor stages 250 having generally axially extending blade retention arrangements 400 such as that shown in FIG. 3, a separate fluid-tight bag 700 may be provided to each blade 100 in the stage 250. In such an arrangement, a fluid supply 720 may supply fluid to one or more (for example all) of the fluid-tight bags 700.

FIG. 4 shows an example of a rotor blade 100 that has a generally circumferentially extending blade retention arrangement 400. Other features of the arrangement may be substantially as described above in relation to FIG. 3.

In the FIG. 4 arrangement, the slot 620 in the disc 600 extends in a generally circumferential direction. The radial gap 750 formed between the radially inner surface 140 of the blade root 120 and the radially inner surface 640 of the slot 620 is circumferentially extending. The radial gap 750 may be continuous around the entire circumference of the rotor stage 250. The fluid-tight bag 700 also extends in a circumferential direction, and may optionally extend around the entire circumference of the rotor stage 250. Optionally, a single fluid-tight bag 700 may engage all of the blade roots 120.

FIG. 4 shows clearly the engagement surface 125 of the blade root 120 engaging with the engagement surface 625 of the disc slot 620. The inflated fluid-tight bag 700 ensures that this engagement is consistent for all blades.

This is also true for arrangements having axially extending blade retention arrangements 400, such as that shown in FIG. 3.

The FIG. 4 arrangement may also comprise a fluid supply 720 and optionally one or more valves 710 such as those shown in FIG. 3, although they are not shown in FIG. 4 for clarity.

Figure 5:
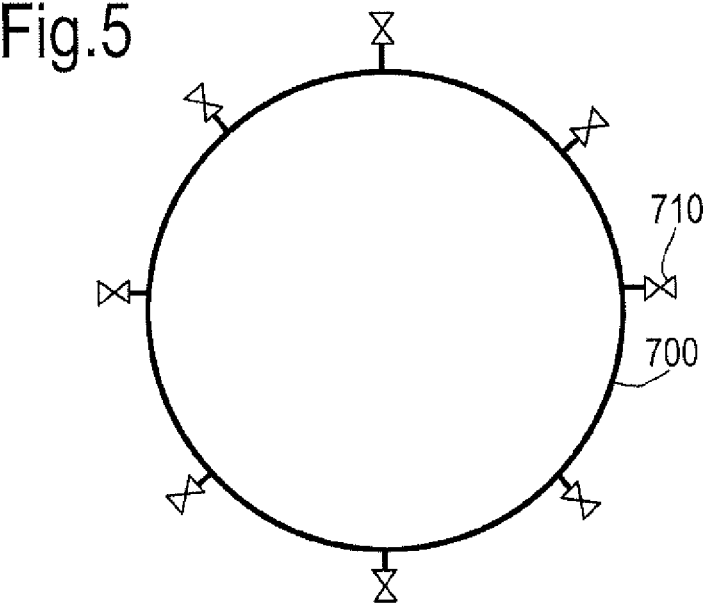
FIG. 5 is a schematic showing an arrangement of fluid supply system.

FIG. 5 is a schematic showing at least one fluid tight bag 700 and more than one valve 710. Each valve 710 may be associated with an individual blade 100. The fluid-tight bag 700 shown schematically in FIG. 5 may be continuous, or may represent more than one fluid-tight bag 700, with, for example, each bag 700 being associated with an individual blade 100. Each valve 710 may be supplied by a its own dedicated fluid supply 720, or a single fluid supply 720 may feed more than one valve 710, for example all valves 710. Purely by way of example, the arrangement shown in FIG. 5 may be used with axially extending blade retention arrangements such as that shown by way of example in FIG. 3.

Figure 6:
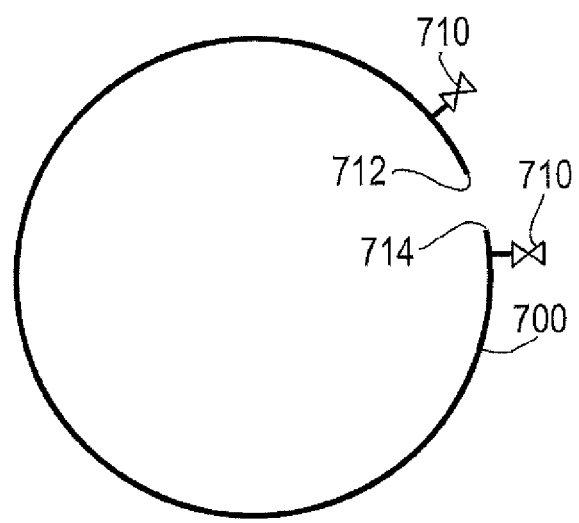
FIG. 6 is a schematic showing an alternative arrangement of fluid supply system.

FIG. 6 is a schematic showing an alternative arrangement of fluid-tight bag 700 and valves 710. In the FIG. 6 example, the illustrated fluid-tight bag 700 is a single, continuous, fluid-tight bag 700, having a first end 712 and a second end 714. Purely by way of example, the fluid-tight bag 700 may extend circumferentially around a circumferentially extending radial gap 750, such as that shown in FIG. 4 by way of example, during the grinding process.

The first and second ends 712, 714 may be moved (for example circumferentially moved) relative to each other, thereby adjusting the radius of the fluid-tight bag 700. Accordingly, a single fluid-tight bag 700 may be used with a range of different rotor stages 250, for example having radially extending gaps 750 at different radii. Although a gap is shown between the two ends 712, 714 in FIG. 6, in use the two ends may overlap, such that the fluid-tight bag 700 is continuous around the circumference.

FIG. 7 is a more detailed schematic view of a part of the fluid-tight bag 700 in position in the circumferentially extending slot 620. Features of FIG. 7 that are equivalent to those of previous Figures are given the same reference numerals and will not be explained again in relation to FIG. 7.

In FIG. 7, the fluid-tight bag 700 is provided with a circumferential locking mechanism (which may be referred to as a circumferential blade-locking mechanism) 800. The circumferential locking mechanism 800 comprises a one-way valve 710 and a nut 810, although it will be appreciated that the circumferential locking mechanism 800 could take any suitable form, for example any form that extends radially through the platforms 105 of two blades 100 when the rotor stage 250 is assembled.

The purpose of the circumferential locking mechanism 800 is to prevent circumferential rotation of the blades 100 within the slot 620. In FIG. 7, some of the blades 100, including those that would be either side of the circumferential locking mechanism 800, are deliberately not shown so as to provide a more clear view of the circumferential locking mechanism 800.

FIGS. 8 and 9 show the position of the circumferential locking mechanism 800 when the rotor stage is assembled, including the blade platforms 105 either side of it. The platforms 105 are provided with cutouts 106 through which the circumferential locking mechanism 800 extends. Because the circumferential locking mechanism 800 extends radially through and between the platforms 105 of neighbouring blades 100, the neighbouring blades 100, and thus all of the blades 100, are prevented from unwanted circumferential movement (shown by arrow A in FIG. 9) within the slot 620.

In the example of FIG. 9, the nut 810 is provided with tool receiving holes 812 for receiving a tightening tool, but it will be appreciated that other arrangements for tightening the nut 810 are possible.

Although not shown explicitly in FIGS. 7 to 9, the circumferential locking mechanism 800 may itself be locked in position relative to the rest of the rotor stage 250, for example through being fastened to and/or integral to the slot 620.

In that case, the fluid-tight bag may attach to a valve portion 710 of the circumferential locking mechanism 800 for inflation.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of grinding blade tips of blades of a rotor stage of a gas turbine engine, wherein:
   the rotor stage comprises:
   a rotor disc and a plurality of radially extending blades, each blade comprising a root that cooperates with a slot in the rotor disc to secure the blade to the rotor disc, with a radial gap being formed between a radially inner surface of a respective root and the slot; and
   the method comprises:
   urging the blades radially outwardly by locating a fluid-tight bag such that the fluid-tight bag is positioned in the radial gap and inflating the fluid-tight bag; and
   rotating the rotor stage relative to a grinding surface so as to grind any blade tips that contact the grinding surface during rotation,
   wherein the grinding surface relative to which the rotor stage is rotated is a radially inner surface of a casing of the gas turbine engine.

2. A method of grinding blade tips according to claim 1, wherein:
   each root extends substantially in an axial direction of rotor stage;
   the slot with which each root cooperates is a respective axially extending slot in the rotor disc, such that the radial gap formed by each root is a respective axially-extending radial gap; and
   the method further comprises locating and inflating a separate fluid-tight bag into each respective axially-extending radial gap before rotating the rotor stage to grind the blade tips.

3. A method of grinding blade tips according to claim 2, further comprising connecting more than one fluid-tight bag to a single fluid supply, the single fluid supply being used to inflate all of the fluid-tight bags to which it is connected.

4. A method of grinding blade tips according to claim 3, wherein each fluid-tight bag is connected to the single fluid supply.

5. A method of grinding blade tips according to claim 2, further comprising connecting each fluid-tight bag to a separate respective fluid supply.

6. A method of grinding blade tips according to claim 1, wherein:
   each root extends substantially in a circumferential direction of the rotor stage;
   the slot with which each root cooperates is a single slot that extends circumferentially around the rotor disc, such that each root cooperates with a same slot and the radial gap is part of a continuous circumferentially-extending radial gap that extends around an entire circumference of the rotor disc; and
   the method further comprises locating and inflating the fluid-tight bag, which is a single circumferentially extending fluid-tight bag, in the continuous circumferentially-extending radial gap before rotating the rotor stage.

7. A method of grinding blade tips according to claim 6, wherein the circumferentially extending fluid-tight bag is circumferentially split so as to have a first end and a second end that are moveable relative to each other to adjust a circumference of the fluid-tight bag.

8. A method of grinding blade tips according to claim 7, further comprising:
   sliding the first end over the second end and adjusting a position of the first end relative to the second end so as to match the circumference of the fluid-tight bag to a circumference of the circumferentially extending slot.

9. A method of grinding blade tips according to claim 6, wherein the circumferentially extending fluid-tight bag comprises a circumferential locking feature that extends radially between two blade platforms so as to prevent circumferential rotation of the blades relative to the slot.

10. A method of grinding blade tips according to claim 9, wherein the circumferential locking feature comprises a one-way valve having a threaded outer portion, with a nut provided to the threaded portion.

11. A method of grinding blade tips according to claim 1, wherein:
    the fluid-tight bag is located into position before blades are assembled to the rotor disc to form the slot.

12. A method of grinding blade tips according to claim 1, wherein:
    the fluid-tight bag comprises a one-way valve; and
    the method further comprises:
    connecting the fluid-tight bag to a fluid supply via the one-way valve prior to the inflation step; and
    disconnecting the fluid-tight bag from the fluid supply after the inflation step but prior to the rotation step.

13. A method of grinding blade tips according to claim 1, further comprising removing the bag after the step of rotating the rotor stage to grind the blade tips.

14. A method of manufacturing a rotor stage of a gas turbine engine comprising:
    providing the rotor disc with the plurality of radially extending blades, each blade extending from the root which is secured into the slot in the rotor disc to the tip at a radially outer extent of the blade; and
    grinding the tips of the blades using the method of claim 1.

15. A method of manufacturing a gas turbine engine comprising grinding the tips of blades of at least one rotor stage of the engine according to the method of claim 1.

* * * * *